United States Patent Office 3,141,830
Patented July 21, 1964

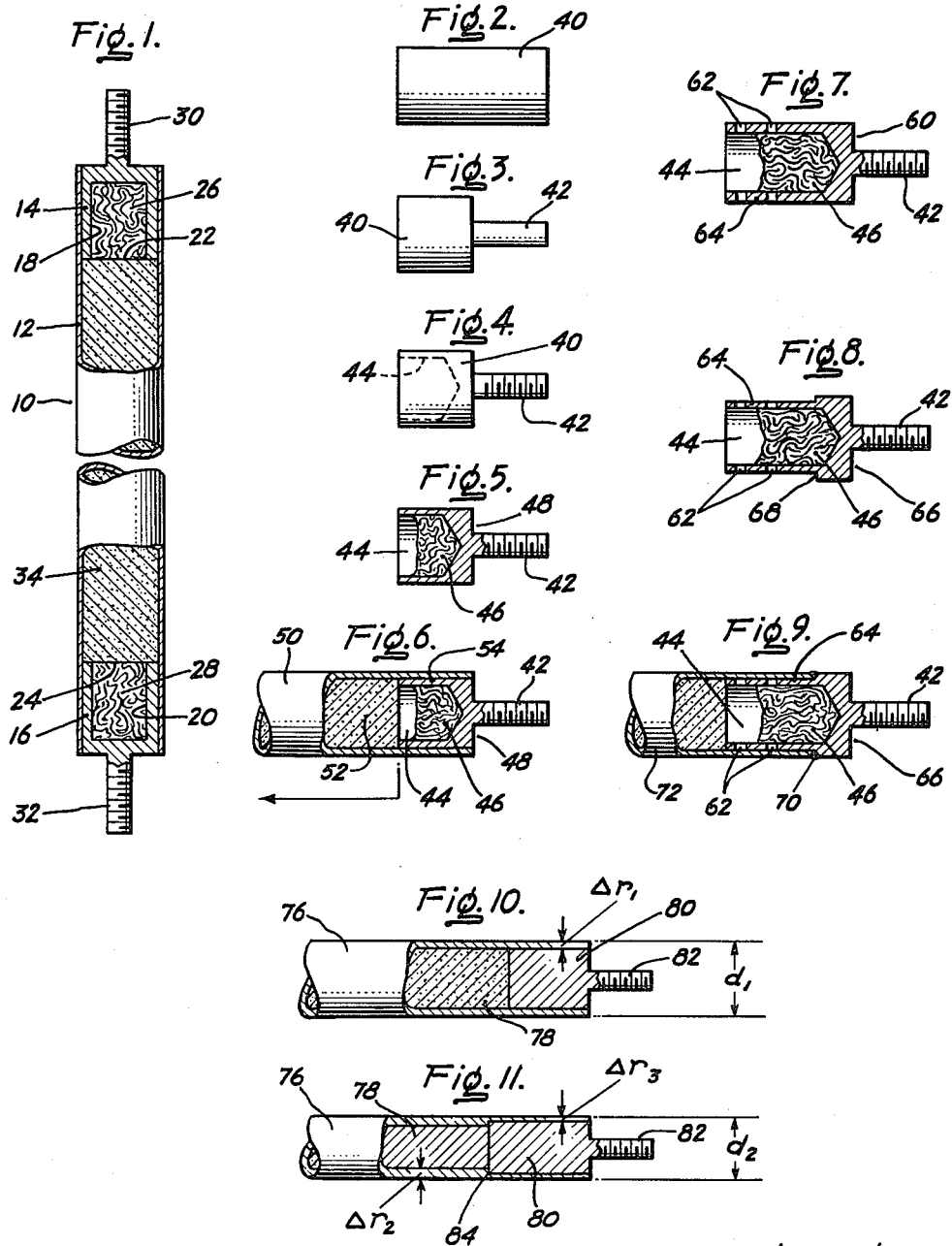

3,141,830
NUCLEAR FUEL ELEMENTS AND MANU-
FACTURING METHOD
Harold H. Klepfer and Millard E. Snyder, Pleasanton,
Calif., assignors to General Electric Company, a corporation of New York
Filed May 9, 1960, Ser. No. 27,774
10 Claims. (Cl. 176—68)

This invention relates broadly to the conversion of mass to energy through neutron induced nuclear fission chain reactions, and it relates more particularly to an improved fuel element and a method for manufacturing such a fuel element for use in a nuclear reactor capable of sustaining such fission chain reactions.

The release of large amounts of energy through nuclear fission chain reactions is now quite well known. In general, a fissionable atom, such as $U^{233}$, $U^{235}$, or $Pu^{239}$, absorbs a neutron in its nucleus and undergoes a nuclear disintegration. This produces on the average, two fission products of lower atomic weight and great kinetic energy, and usually two or three high energy neutrons. For example, the fission of $U^{235}$ produces a light fission product and a heavy fission product with mass numbers ranging between 80 and 110 and between 125 and 155 respectively, an average of 2.5 neutrons, and some energetic gamma radiation. The total energy release approaches about 200 mev. (million electron volts) per fission event.

The kinetic energy of the fission products and neutrons is quickly dissipated in the fuel and other ambient material as heat. If after this heat generation there is at least one net neutron remaining which induces a subsequent fission, the fission reaction becomes self-sustaining and the heat generation is continuous. The heat is removed by passing a coolant through heat exchange relationship between the fuel material and a heat sink. The reaction may be continued as long as sufficient fissionable material remains in the system to override the effects of the fission products which also may be present.

In order to maintain such fission reactions at a rate sufficient to generate usable quantities of thermal energy, nuclear reactors are presently being designed, constructed, and operated in which the fissionable material or nuclear fuel is contained in fuel elements which may have various geometric shapes, such as plates, tubes, or rods. The fuel material is usually enclosed in a corrosion-resistant, non-reactive, heat conductive container or clad which contains no fissionable or fertile material. The elements are assembled together in a lattice at fixed distances from each other in a coolant flow channel or region forming a fuel assembly, and sufficient fuel assemblies are combined to form the nuclear fission chain reacting assembly or reactor core capable of the self-sustained fission reaction referred to above. The core is enclosed within a reactor vessel through which a coolant is passed.

The clad serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common clad materials are stainless steel, aluminum and its alloys, zirconium and its alloys, niobium (columbium), certain magnesium alloys, and others. The failure of the clad, due to the build-up of gas pressure or high temperatures in the fuel, can contaminate the coolant or moderator and the associated systems with intensely radioactive long-lived products to a degree which interferes with plant operation.

Serious problems have been encountered in the manufacture and in the operation of nuclear fuel elements which employ certain metals and alloys as the clad material due to the reactivity of these materials under certain circumstances. Zirconium, and its alloys, under normal circumstances are excellent materials as a nuclear fuel clad since they have low neutron absorption cross sections and at temperatures below at about 600° F. are extremely stable and non-reactive in the presence of demineralized water or steam which are commonly used as reactor coolants and moderators. At higher temperatures, however, the protective oxide film on the surface of these materials appears to fail more rapidly, and the material deteriorates apparently due to exposure at these temperatures to water and water vapor. It is also adversely affected by such gases as hydrogen, oxygen, nitrogen, carbon monoxide, and carbon dioxide at all temperatures.

We have recently found that the zirconium base clad of a nuclear fuel element is exposed to one or more of these gases during irradiation in a nuclear reactor in spite of the fact that these gases may not be present in the reactor coolant or moderator, and further may have been excluded as far as possible from the ambient atmosphere during manufacture of the clad and the fuel element. We have found that sintered refractory and ceramic compositions, such as uranium dioxide and others used as nuclear fuel, release measurable quantities of the aforementioned gases upon heating, such as during fuel element manufacture or during irradiation, and that these gases react with zirconium base clad material containing the nuclear fuel. The results of this reaction include embrittlement of the clad which endangers the integrity of the fuel element. Although water and water vapor do not react directly to produce this result, at high temperatures water vapor does react with zirconium to produce hydrogen and this gas further reacts with the zirconium to cause embrittlement. These undesirable results are exaggerated by the release of these gases within the sealed metal-clad fuel element since it increases the internal pressure within the element and thus introduces stresses not anticipated in the original design of the clad tube.

One or more of the aforementioned gases are normally present in the atmosphere or released from the fuel during manufacture of zirconium base metal clad fuel elements. They are particularly troublesome during the high temperature assembly operations during which the ends of the clad tube are sealed, such as by welding. This operation tends to contaminate the interior of the fuel element with these gases and to accelerate their reaction with the zirconium weld metal and with the metal in the heated parts adjacent the weld. This contamination interferes with the production of a seal of high integrity.

Attempts involving elaborate procedures made to avoid these manufacturing and operational problems have met with only limited success. In some cases the fuel material is first out-gassed at high temperature and low pressure. The clad tubes are then filled with the out-gassed material in vacuo or in an inert gas atmosphere and then seal welded. This involves much hand work and intricate manufacturing equipment and operations. Another attempt to avoid the problems involved the substitution of the high temperature welding step with low temperature pressure-induced welding in which the materials are rolled, extruded, or swaged to bond them together. Again the results are of dubious success in that the clad tube which surrounds and contacts the end plug thins excessively while the radial thickness of the clad in the remainder of the tube thickens with the treatment. This produces an abrupt change in the radial thickness in the clad at the point immediately adjacent the inner end of the end plug. This notch behaves as a stress raiser and frequent failures at this point result. In addition, the contacting surfaces of the clad tube and the end plug very frequently fail to join properly apparently due to contamination of these surfaces by adsorption of or reaction with one or more of the listed gases.

These same problems are encountered with zirconium and its alloys, niobium and its alloys, and yttrium and its alloys, and regardless of whether the fuel container or clad is circular, annular, square, rectangular, hexagonal, or of other geometric cross section.

It has now been found that all of the aforementioned operational and manufacturing problems encountered in nuclear fuel elements clad with zirconium, niobium, yttrium, and their alloys can be overcome by means of the particular nuclear fuel element and manufacturing method of this invention.

It is therefore an object of this invention to provide an improved nuclear reactor fuel element having a zirconium, niobium, or yttrium base clad material and which is free from defects usually caused by the aforementioned gases.

It is another object of this invention to provide an improved method for the manufacture of zirconium, niobium, or yttrium base clad nuclear fuel elements whereby problems due to the sensitivity of such materials to the aforementioned gases or due to the clad notching, or both, usually encountered in the sealing of the clad tube are avoided.

It is a further object of this invention to provide an improved method for the manufacture of metallic clad nuclear fuel elements which avoid the clad notching problem.

Other objects and advantages of this invention will become apparent to those skilled in the art as the description and illustration thereof proceed.

Briefly, one aspect of the present invention comprises a nuclear fuel element having an elongated container or clad having an internal opening, a body of nuclear fuel material disposed in the opening, an end closure integrally secured and sealed at each end of the container, at least one of the end closures being hollow and having a cavity which communicates with the internal opening of the container, and a relatively low density compact contained in the cavity.

Another aspect of this invention comprises an improvement in the manufacture of nuclear fuel elements in which at least the ends are subjected to a bonding operation to seal the fuel container and its end closure at the element ends, which improvement comprises the steps forming a hollow end closure having a cavity opening from one end only, inserting into the cavity a relatively low density compact, inserting the end closure containing the compact into the end of the fuel container or clad so that the cavity communicates with the interior opening of the container, and then bonding the adjacent surfaces of the container to the end closure to form an integral and fluid tight connection between said container and said end closure.

The present invention will be more readily understood by reference to the following detailed description and illustration of this invention and the accompanying drawings in which:

FIGURE 1 is a foreshortened longitudinal partial cross section view of a nuclear fuel rod or element embodying the present invention;

FIGURES 2-6 show a sequence of steps in manufacturing the end plug and the fuel element shown in FIGURE 1;

FIGURE 7 shows a modified form of end plug;

FIGURE 8 shows another modification of the end plug which is specifically adapted to high temperature welding to the fuel container or clad;

FIGURE 9 shows the modified end plug of FIGURE 8 welded to the end of a fuel container or clad; and FIGURES 10 and 11 show one of the difficulties encountered in manufacturing when conventional solid end plugs are secured to the ends of the container or clad by means of the low temperature, high pressure bonding methods referred to previously.

In FIGURE 1 a nuclear fuel element 10 of the rod type, of circular geometric cross section, is shown embodying the present invention. It should be understood that the container or clad can just as well have any other geometric cross section, and that tubular containers, i.e., clad tubes, are referred to for simplicity of illustration in describing the drawings. For the same reason, the container is described as a zirconium base material. A zirconium base clad tube 12 is provided having zirconium base end plugs or caps 14 and 16 inserted into the clad tube ends. Each of the end plugs is hollow and is provided with a cavity 18 and 20, respectively. The openings 22 and 24 of these cavities are located at the inner end of plugs 14 and 16 so that cavities 18 and 20 open into and communicate with the interior of fuel element 10. Cavities 14 and 16 are provided with a relatively low density, porous, fluid permeable, resilient compact 26 and 28, respectively. End plugs 14 and 16 are further provided with a means for supporting the fuel element or for securing a number of fuel elements coaxially to one another. These means in this illustration comprise threaded extensions 30 and 32, although others can be substituted. The outer surfaces of end plugs 14 and 16 are immediately adjacent and in close contact with the inner surface at the ends of clad tube 12. These contacting surfaces are bonded together to form a mechanically rigid fluid-tight connection. The nuclear fuel material 34 is contained as a body within the rigid and sealed integral structure formed by clad tube 12 and end plugs 14 and 16.

Compacts 26 and 28 are preferably composed of the elemental metallic or alloy forms of zirconium, niobium, titanium, yttrium, or hafnium, or mixtures and alloys thereof. The compact is porous with interconnected interstices rendering it fluid permeable. It preferably has a bulk density which is relatively low, being substantially less than the absolute density of the material of which it is composed. Compact bulk densities in the range of from 50%-85% of the absolute density have been found to be effective. The compact may take the form of a mat or compress of chips, granules, shavings, wool, wire, powder, or the like produced from the materials listed immediately above. These materials may be compressed and partially sintered, such as in the case of small granules or powders, prior to insertion into the cavity. These resilient and fluid permeable compacts have been found to produce unexpected and surprising advantageous results both in the manufacture and the operation of nuclear fuel elements having zirconium, niobium, or yttrium base clads. These results are further described below.

Referring now to FIGURES 2-6, the manufacturing method will be described. In FIGURE 2 is shown a right circular cylinder or blank 40 of zirconium base material suitable for the manufacture of an end plug for a rod-type fuel element. In FIGURE 3 the right hand end of blank 40 has been turned down to provide projection 42. In FIGURE 4 projection 42 has been threaded and a cavity 44 has been provided opening from the left hand end of blank 40. In FIGURE 5 a resilient, fluid-permeable compact 46 has been inserted into cavity 44 to produce the finished end plug 48. In FIGURE 6 the finished end plug 48 has been inserted into the open end of a container or clad tube 50 containing nuclear fuel 52. The finished nuclear fuel rod as shown in FIGURE 1 is produced from the assembly partially shown in FIGURE 6 by the application of relatively high pressures to the external surface of the clad tube by such techniques as swaging, rolling, or extrusion of the assembly at temperatures substantially below the melting point of the container and end closure materials.

In the fuel element manufacturing operation using these relatively low temperature techniques, the resiliency of Thus for the low temperature high pressure compaction and bonding of fuel elements according to the present invention and using zirconium base clad materials, permeable compacts having densities above about 50% and below about 85% of theoretical density, reduction temperatures above about 1500° F. and below about 2200° F., and the use of hollow end plugs having wall thicknesses in the range of 0.5 to 2.0 times the clad tube thickness are the preferred conditions.

Corresponding experiments with yttrium, niobium (columbium), and their alloys have shown that this invention is successfully applied to such materials under the same conditions as given above for zirconium base materials, except that the minimum bonding temperature for niobium is slightly higher than 1500° F.

The foregoing specific examples have referred to one specific nuclear fuel, namely, uranium dioxide. This should not consider to be a limitation since the successful practice of this invention has been found to be entirely independent of the chemical and physical nature of the fuel material. The fuel may contain fully enriched fissionable material, fully depleted or only fertile material, or mixtures of these materials in any proportion. The fissionable materials contemplated include $U^{233}$, $U^{235}$, $Pu^{239}$, and $Pu^{241}$. The fertile materials contemplated include $U^{238}$ and $Th^{232}$.

The nuclear fuel material may be present in metallic or elemental form, or as alloys in different mixture with each other or with other metals such as aluminum, zirconium, stainless steel, niobium (columbium), and the like. The fuel material may also be present in compound form such as the oxides, carbides, silicides, nitrides, and other refractory or ceramic compounds. All of the foregoing metallic, alloy, and compound forms of the nuclear fuel materials have been found to release one or more of the gases referred to herein during operation.

A particular embodiment of this invention has been described in considerable detail by way of illustration. It should be understood that various other modifications and adaptations thereof may be made by those skilled in this particular art without departing from the spirit and scope of this invention as set forth in the following claims.

We claim:

1. A nuclear reactor fuel element which comprises an elongated container having an internal opening, a body of nuclear fuel material disposed in said opening, an end closure integrally secured and sealed at each end of said container, said container and end closures of said fuel element being fabricated from a metal having as a major constitutent a metal selected from the class consisting of zirconium, niobium (columbium) and yttrium, at least one of said end closures being hollow and having a cavity which communicates with said internal opening of said container, and a resilient, porous, fluid-permeable metallic compact contained in said cavity, said compact being fabricated from a metal having as a major constitutent a metal selected from the class consisting of zirconium, niobium (columbium), titanium, yttrium, and hafnium, said compact having a bulk density of between about 50% and about 85% of the theoretical density of the metal from which it is made.

2. A nuclear reactor fuel element which comprises an elongated zirconium clad tube having an internal opening, a body of nuclear fuel material disposed in said opening, a zirconium end plug inserted into and integrally secured and sealed to each end of said clad tube, at least one of said end plugs being hollow and having a cavity which opens into communication with said internal opening, and a resilient porous, fluid-permeable zirconium compact contained in said cavity and having a bulk density between about 50% and about 85% of the theoretical density of zirconium.

3. A fuel element according to claim 2 wherein said end plug is provided with a plurality of radial openings in that portion of said plug surrounding said cavity, said openings extending outwardly to and are closed by the wall of the clab tube.

4. In a method for producing a nuclear fuel element, the improvement which comprises forming a hollow end closure having a cavity opening from one end only, inserting into said cavity a resilient, porous, fluid-permeable metallic compact, inserting the end closure containing the compact into the end of an elongated fuel container having an internal opening so that the cavity communicates with said internal opening, and then bonding the end of said container to said end closure to form a fluid tight seal therebetween, whereby said resilient material compact functions to prevent deleterious effects on said fuel container otherwise resulting from bonding said container to said end closure.

5. A method according to claim 4 wherein said compact has a bulk density of between about 50% and about 85% of the theoretical density of the metal from which it is made.

6. A method according to claim 5 wherein bonding of said container to said end closure is accomplished by the application of relatively high pressures to the external surface of said container at relatively low temperatures substantially below the container end closure melting point.

7. A method according to claim 4 wherein bonding of said container to said end closure is accomplished by fusion welding.

8. In a method for producing a nuclear fuel element, the improvement which comprises forming a hollow end plug having a cavity opening from one end only, inserting into said cavity a porous and fluid permeable resilient metallic compact fabricated of a metal having as a major constituent a metal selected from the class consisting of zirconium, niobium (columbium), titanium, yttrium, and hafnium, inserting the end plug into the end of an elongated metallic fuel tube having an internal opening so that the cavity and said compact communicate with said internal opening, and then bonding the end of said fuel tube and said end plug together in proximity to said resilient metallic compact to form a fluid tight seal therebetween, whereby said resilient metallic compact functions to prevent deleterious effects on said fuel tube resulting from the bonding of said fuel tube to said end plug.

9. A method according to claim 8 wherein said fluid tight seal is formed by fusion welding.

10. A method according to claim 8 wherein said compact has a bulk density of between about 50% and about 85% of the theoretical density of the metal from which it is fabricated, and wherein said fluid tight seal is formed by the application of relatively high pressures to the external surface of said fuel tube at temperatures substantially below the melting point of said fuel tube and end plug.

References Cited in the file of this patent

UNITED STATES PATENTS 3,010,889    Fortescue et al. _____ Nov. 28, 1961

OTHER REFERENCES

AEC Document SCNC–259, May 1958.
AEC Document NAA–SR–4155, October 1, 1959, page 8.
AEC Document HW–51855, January 3, 1958, pp. 2–8 and 11.

compact 46 apparently cooperates with the hollow end plug and provides a yieldable internal resistance to the clad-plug bonding forces applied on the outside surface of clad tube 60 during the compaction of nuclear fuel body 52 and the bonding of the end of the clad tube integrally to the end plug without "notching" the clad metal. In addition, as indicated in the subsequent specific examples, the presence of the compact appears in some way to protect the adjacent contacting surfaces 54 from contamination and thus facilitates the formation of a clad tube-end plug bond of high integrity. Furthermore, through mechanisms that are not now fully understood, the fluid permeable compact in the fuel elements of this invention prevents the generation of the normally expected increase in internal pressure in the fuel element and substantially reduces the embrittlement of clad tube 50 during irradiation.

*Example 1*

A Zircaloy clad fuel element or rod about 30 inches long is 0.50 inch in outside diameter, has a radial clad thickness of 0.025 inch, and contains $UO_2$ fuel pellets of 96% of theoretical density. The end plugs are solid zirconium welded to the ends of the clad tube. A void space 1.50 inches long and 0.45 inch in diameter remains at one end in the fuel rod. This fuel element shows an increase in internal gas pressure from 14.7 p.s.i.a., when newly manufactured, to 350 p.s.i.a after irradiation to $5 \times 10^{19}$ *nvt*. By comparison, an otherwise identical fuel rod provided at each end with the end plug according to this invention in which a cavity 0.30 inches in diameter and 1.10 inches long and originally filled with a permeable metallic zirconium compact of 70% of theoretical density, shows an internal gas pressure rise of from 3.0 p.s.i.a. to only 110 p.s.i.a. on irradiation to $5 \times 10^{19}$ *nvt*.

In FIGURE 7 is shown a modified form of the end plug of FIGURES 1 and 5. This end plug 60 is provided with threaded projection 42, compact 46 in the cavity 44, and in addition with a plurality of radial openings 62 in the wall of the end plug surrounding the cavity. These openings extend out to and are closed by the clad tube and do not impair the yieldable resistance of the end plug-compact combination to externally applied bonding pressures during manufacture, but appear to facilitate the function of compact 46 in maintaining the exterior surface 64 of end plug 60, and the interior surface of the clad tube which the end plug contacts, free from contamination during the bonding step, and increase from well below 50% to substantially above 95% the number of successful fuel element end closure operations.

In FIGURE 8 is shown another modification of the end plug shown in FIGURE 7. In this end plug 66, shoulder 68 is provided to contact the end of the clad tube with which it is used, in addition to contacting the inner surface near the clad tube end.

In FIGURE 9 is shown the end plug of FIGURE 8 inserted into and welded at 70 to the end of a clad tube 72. It has been found that the fluid permeable compact 46 maintains the adjacent contacting surfaces of end plug 66 and clad tube 72 and the weld 70 itself free of contamination even during the high temperature operation in which weld 70 is formed at and above the clad material melting temperatures. The compact used here in a welded element need not be resilient or within the density limits stated above.

In FIGURES 10 and 11 are shown some of the adverse results of using conventional end plugs in the manufacture of a nuclear fuel element formed by relatively low temperature, high pressure bonding operation and without utilizing the present invention. In FIGURE 10 a clad tube 76 containing nuclear fuel body 78 is provided at its end with a solid end plug 80 having threaded projection 82. The clad tube has a relative diameter of $d_1$ and the radial clad thickness is $\Delta r_1$. To bond the clad tube and the end plug together, the structure shown in FIGURE 10 may be passed through a rolling mill, an extrusion press, or a swaging mill, in the course of which the fuel element diameter is reduced to $d_2$. The result is shown in FIGURE 11. The radial thickness of clad tube 76 materially increases to $\Delta r_2$ in those regions where it surrounds nuclear fuel body 78. End plug 80 is slightly elongated and reduced in diameter. Of most importance is the fact that that portion of the clad tube 76 which immediately surrounds end plug 80 thins excessively to a radial thickness $\Delta r_3$ which is substantially less than either $\Delta r_1$ or $\Delta r_2$ thus providing a notch at the inner end of end plug 80 and at which the radial thickness of the clad abruptly changes. Experimentation has shown that the adjacent surfaces of end plug 80 and clad tube 76 are not uniformly bonded apparently due to surface contamination. Further experimentation has shown that the notch at 84 is an extremely weak point and the clad tends to fail circumferentially along this notch.

*Example 2*

A Zircaloy clad tube 0.50 inch in outside diameter and 0.025 inch in wall thickness was filled with $UO_2$ powder, provided with solid zirconium end plugs, and reduced in a swaging mill to an outside diameter of 0.375 inch. The clad tube thickened to about 0.070 inch in thickness around the fuel powder, but it thinned to about 0.013 inch adjacent the end plug which elongated considerably. The "notch" which resulted cracked readily in a circumferential direction.

The following specific examples of the production of nuclear fuel utilizing the methods of the present invention are presented in tabular form and all involve $UO_2$ powder compaction and Zircaloy end plug-clad tube bonding by means of hot swaging. The compacts employed were also Zircaloy.

*Examples 3–14*

| Run No. | Swaging Temp., °F. | Percent Area Reduction | Compact [1] Density, Percent | Thickness, inches [2] | | Degree of Notching | Extent of Bonding | Comments on Results of Test |
| --- | --- | --- | --- | --- | --- | --- | --- | --- |
| | | | | Tube Wall | Plug Wall | | | |
| 1 | 1,500 | 45 | | 0.030 | | Serious | None | Unsuccessful. |
| 2 | 1,500 | 50 | | 0.030 | | do | do | Do. |
| 3 | 1,400 | 55 | | 0.030 | | do | do | Do. |
| 4 | 1,600 | 60 | | 0.030 | | do | Slight | Do. |
| 5 | 1,700 | 63 | | 0.030 | | do | Bonded | Bonded due to temperature. |
| 6 | 1,700 | 63 | 75 | 0.030 | 0.030 | None | do | Successful. |
| 7 | 1,700 | 63 | 45 | 0.030 | 0.030 | do | None | Compact density too low. |
| 8 | 1,700 | 63 | 85 | 0.030 | 0.030 | Slight | Fair | Compact not sufficiently permeable. |
| 9 | 1,400 | 63 | 75 | 0.030 | 0.030 | None | Poor | Temperature too low. |
| 10 | 1,700 | 70 | 60 | 0.030 | 0.030 | do | Bonded | Successful. |
| 11 | 1,500 | 63 | 75 | 0.030 | 0.030 | do | Partial | Lower temperature limit. |
| 12 | 2,200 | 70 | 60 | 0.030 | 0.030 | do | Bonded | Powder-clad reaction. |

[1] Runs 1–5 solid plug, no compact.
[2] Prior to swaging.